Patented June 24, 1952

2,601,561

UNITED STATES PATENT OFFICE 2,601,561

SYNTHETIC DRYING OILS FROM POLYVINYL ALCOHOL AND METHOD OF PRODUCTION

Glenwood L. Schertz, Wilmington, Del., assignor to Hercules Powder Company, Wilmington, Del., a corporation of Delaware No Drawing. Application May 5, 1949, Serial No. 91,628

20 Claims. (Cl. 260—23)

This invention relates to synthetic drying oils and to a method for their production, and more particularly to the reaction product prepared from a polyvinyl alcohol and an unsaturated fatty acid and to methods for the production thereof.

This application is a continuation-in-part of my application Serial No. 676,106, filed June 11, 1946, now abandoned.

In protective coating technology, one of the goals sought is the preparation of an oleoresinous coating composition having a drying speed approximating that of a lacquer, and which at the same time yields films of good durability and alkali and water resistance. The reaction products of this invention, when dissolved in a suitable solvent, yield films which approximate these desired qualities very closely.

It has heretofore been proposed to form polymers of vinyl esters of unsaturated fatty acids. It has been found, however, that such vinyl esters do not form linear polymers but on the other hand form highly cross-linked compounds. Gelled, insoluble, infusible products usually result from attempted polymerization. In those cases wherein it is possible to isolate an ungelled polymer, it is found to be of low molecular weight, to possess poor drying characteristics and to provide films which do not possess the toughness of the films derived from natural drying oils.

In accordance with this invention it has been found that synthetic drying oils, of substantially improved drying characteristics as compared with natural drying oils, can be prepared by esterifying a polyvinyl alcohol of rather high molecular weight with an unsaturated fatty acid containing at least fourteen carbon atoms. The esterification reaction is carried out by heating the two materials in solution in a mutual solvent at a temperature of from about 150° C. to about 250° C.

The polyvinyl alcohols which may be used are those having an average molecular weight of from 6,000 to 80,000, and preferably those alcohols having an average molecular weight of from 10,000 to 60,000 will be employed. Such polyvinyl alcohols which are partially but not entirely acetylated may be employed in accordance with this invention. Thus, polyvinyl alcohols defined as aforesaid which are acetylated to any extent up to and including 60% acetylation may be employed. By the term "average molecular weight" it will be understood that there is meant an average molecular weight on a number basis rather than on a weight basis. The term will be used in this sense throughout the specification and claims.

The reaction products are unsaturated fatty acid esters of polyvinyl alcohols. They have resinous characteristics and valuable and unique drying properties. They are of high molecular weight and are composed of linear molecules. Thus, they may properly be described as linear polymers rather than as cross-linked polymers. Coating compositions prepared by dissolving these new products in volatile solvents have a high drying speed, rapidly setting to tough hard films when applied to a surface at ordinary room temperature. The films so produced do not become brittle on aging and are exceptionally scuff-resistant and give excellent performance in outdoor exposure tests.

The following examples are illustrative of the new drying oils and methods for the preparation thereof. In these examples all parts and percentages are by weight unless otherwise specified.

Example I

Eight hundred parts of phenol and 88 parts of polyvinyl alcohol were placed in a reaction vessel equipped with a stirrer, a thermometer, and a distilling arm which was so arranged that the phenol could be either refluxed or distilled out. The polyvinyl alcohol employed was a polymer having a viscosity in 4% aqueous solutions at 20° C. of 5 cps. as determined using a Hoeppler viscosimeter. It had an average molecular weight of about 14,000. The phenol and polyvinyl alcohol were heated to 160° C., at which temperature a clear, homogeneous solution was formed. Seven hundred parts of dehydrated castor oil fatty acids were then slowly added at a rate such that the solution showed no signs of turbidity. Simultaneously the temperature of the reaction mixture was slowly raised to 185° C., at which temperature the phenol began distilling. The addition of fatty acid and the removal by distillation of phenol were adjusted at rates such that the solution remained clear. At the end of 4 hours all of the fatty acid had been added, 750 parts of phenol and water had been recovered, and the reaction mixture had attained a temperature of 235° C. Esterification was continued for a further period of 2.5 hours at a temperature of 235° C. with a carbon dioxide sparge being employed. At this time, a total of 831 parts of distillate containing phenol, water of esterification and any other volatile material had been recovered. The residue consisting of 760 parts of ester was next extracted 5 times with volumes of methyl alcohol equal to that of the ester.

This procedure yielded 358 parts of a methyl alcohol-insoluble ester having an acid number of 18 and a saponification number of 170.

The alcohol-insoluble portion was diluted with an equal weight of xylene and stabilized with 0.04% of guaiacol, based on the weight of the polyvinyl ester. After 0.05% cobalt drier (also based on the weight of the polyvinyl ester) had been added, this solution dried cotton-free in 90 minutes and foil-free overnight when applied to a surface.

*Example II*

Forty-four parts of polyvinyl alcohol and 350 parts of oleic acid (U. S. P. grade) were kettled to form a reaction product using the procedure described in Example I and using 400 parts of phenol as a solvent. The polyvinyl alcohol employed was a polymer having a viscosity in 4% aqueous solution at 20° C. of 5 cps. as determined using a Hoeppler viscosimeter. It had an average molecular weight of about 14,000. At the end of the reaction, 403 parts of distillate containing phenol, water of esterification and other volatile material had been recovered. The residue after successive extraction with 5 volumes of methanol (based on the volume of residue) yielded 180 parts of ester having an acid number of 26 and a saponification number of 174.

A coating composition containing this reaction product diluted with an equal weight of xylene and containing 0.04% of guaiacol, based upon the weight of the ester, and 0.05% of cobalt drier (also based upon the weight of the ester) set to a hard film in 24 hours.

*Example III*

Eighty-eight parts of polyvinyl alcohol and 700 parts of linseed oil fatty acids were esterified as described in Example I, using 800 parts of phenol as the solvent. The polyvinyl alcohol employed was a polymer having a viscosity in 4% aqueous solutions at 20° C. of 5 cps. as determined using a Hoeppler viscosimeter. It had an average molecular weight of about 14,000. At the end of the esterification reaction, 788 parts of distillate containing phenol and water of esterification had been recovered. After successive extraction with 5 volumes of methanol equal to that of the crude ester, 395 parts of the finished ester was obtained having an acid number of 12.5 and a saponification number of 139.

This low acid number ester was diluted with an equal volume of xylene and stabilized with 0.04% of guaiacol, based upon the weight of the ester. After the addition of 0.05% of cobalt drier (also based upon the weight of the ester) the coating composition produced dried cotton-free in 50 minutes and foil-free in 5 hours.

*Example IV*

Seventy-one parts of polyvinyl alcohol and 350 parts of linseed oil fatty acids were esterified as described in Example I using 400 parts of phenol as the solvent. The polyvinyl alcohol employed was a polymer having a viscosity in 4% aqueous solutions at 20° C. of 5 cps. as determined using a Hoeppler viscosimeter. It had an average molecular weight of about 14,000. An ester having an acid number of 125 was produced. One hundred parts of this viscous ester was extracted twice with methanol, to yield 65 parts of a reaction product having an acid number of 35.

A coating composition was prepared by diluting this product with an equal weight of xylene and thereafter stabilizing with 0.04% of guaiacol. After the addition of 0.05% of cobalt in the form of a drier, this coating composition dried foil-free in about 5 hours.

*Example V*

Forty-four parts of polyvinyl alcohol and 350 parts of linseed oil fatty acids were esterified according to the procedure of Example I, using 400 parts of cresol (resin grade) as a solvent. The polyvinyl alcohol employed was a polymer having a viscosity in 4% aqueous solutions at 20° C. of 5 cps. as determined using a Hoeppler viscosimeter. It had an average molecular weight of about 14,000. After the esterification reaction had been completed a reaction product having an acid number of 112 was produced, and 390 parts of distillate containing cresol, water of esterification and other volatile material had been recovered. Two hundred sixty-five parts of this high acid number ester were extracted 5 times with equal volumes of methanol to yield 129 parts of a methyl alcohol-insoluble ester having an acid number of 11.

The ester was diluted with an equal weight of xylene and 0.04% of guaiacol added in order to stabilize the mixture. A coating composition containing the diluted ester and 0.05% of cobalt in the form of a drier dried cotton-free in 50 minutes and foil-free in 6 hours.

*Example VI*

Eighty-eight parts of polyvinyl alcohol and 700 parts of soybean oil fatty acids were esterified according to the procedure of Example I, using 800 parts of phenol as a solvent. The polyvinyl alcohol employed was a polymer having a viscosity in 4% aqueous solutions at 20° C. of 5 cps. as determined using a Hoeppler viscosimeter. It had an average molecular weight of about 14,000. After the esterification had been completed, a distillate containing 785 parts of phenol, water of esterification and other volatiles had been recovered. Six hundred eighty-nine parts of the ester were extracted five times with an equal volume of methanol to yield 358 parts of a methyl alcohol-insoluble ester having an acid value of 18.5 and a saponification value of 192.5.

A coating composition prepared by diluting the ester with an equal volume of xylene and 0.05% cobalt drier, based upon the weight of ester, dried cotton-free in 90 minutes and foil-free in 6 to 7 hours. At temperatures of 98–100° C., this composition dried in 3 to 5 minutes.

*Example VII*

Forty-four parts of polyvinyl alcohol and 350 parts of linseed oil fatty acids were esterified as described in Example I using 400 parts of phenol as solvent. The polyvinyl alcohol employed was a relatively high molecular weight polymer having a viscosity in 4% aqueous solutions at 20° C. of 55 cps. as determined by using a Hoeppler viscosimeter. It had an average molecular weight of about 52,000. The resulting ester was extracted 5 times with equal volumes of methyl alcohol to yield a product similar in character to the purified esters of the foregoing examples with the exception that it was much more viscous.

*Example VIII*

A 25-gallon varnish was prepared by heating together 190 parts of a polyvinyl lineoleate (prepared as described in Example IV) and 95 parts of the pentaerythritol ester of rosin. The 2 ingredients were heated in an open kettle to 260° C. in 15 to 20 minutes. When a long string formed on the varnish paddle, the heat was removed and the varnish solids were thinned to 50% nonvolatile with Varsol (trade name for an aliphatic hydrocarbon fraction used for diluting varnishes). A cobalt drier, 0.05% based on the polyvinyl linoleate, was then added. This varnish had a viscosity of C to D on the Gardner-Holdt scale and dried foil-free in 3¼ hours. The dried varnish film had the improved characteristics corresponding to those of the film from the polyvinyl ester alone.

It has been stated previously that the comparatively high molecular weight polyvinyl alcohols which are useful in accordance with this invention are those having an average molecular weight of from 6,000 to 80,000, preferably those having an average molecular weight of from 10,000 to 60,000. Polyvinyl alcohols of molecular weight 6,000 and 80,000 correspond with alcohols having about 130 and about 1800 hydroxyl groups per molecule. It will be evident, therefore, that the subject reaction products are quite highly polymeric in nature.

In the examples reference has been made to the viscosities in centipoises of 4% aqueous solutions at 20° C. of the polyvinyl alcohols employed using a Hoeppler viscosimeter. Such a measurement represents a practical means of ascertaining the approximate molecular weight of a particular polyvinyl alcohol. A polyvinyl alcohol having an average molecular weight of 14,000 will have an approximate viscosity determined as above-indicated of 5 centipoises, whereas a polyvinyl alcohol having an average molecular weight of 52,000 will have an approximate viscosity of 50-55 centipoises. The former type of polyvinyl alcohol may be referred to as a low viscosity type and the latter as a comparatively high viscosity type.

Polyvinyl alcohols are manufactured commercially by the hydrolysis of polyvinyl acetate. It is possible in the hydrolysis process to remove all or only part of the acetyl groups. As indicated previously, polyvinyl acetates which are only partially hydrolyzed may be used in carrying out the invention. Stated conversely, polyvinyl alcohols which are partially acetylated may be employed. Thus, the polyvinyl alcohols described in the foregoing paragraph which are acetylated to any extent up to and including 60% acetylation are useful in making the compositions of this invention. The polyvinyl alcohols which are substantially free of acetyl groups are, however, preferred. Although the invention is described in this specification with particular reference to such polyvinyl alcohols, it will be understood that the aforementioned partially acetylated alcohols are also operable and within the broad scope of the invention.

Any unsaturated fatty acid containing at least 14 carbon atoms, and preferably from 14 to 24 carbon atoms, may be esterified with the polyvinyl alcohol to produce the reaction products in accordance with this invention. The unsaturated fatty acid must contain at least one ethylene linkage and may contain two or more ethylene groups in any position in the hydrocarbon chain which unsaturation may or may not be present as a conjugated system of double bonds. Suitable acids for this purpose are myristoleic, palmitoleic, oleic, linoleic, linolenic, eleostearic, arachidonic, clupanodonic, licanic, lauroleic, gadoleic, erucic, etc. acids and their various isomers. Either the pure acids or mixtures of the acids may be used. A convenient source of these acids in the form of mixtures is obtained by the hydrolysis of nondrying, drying and semidrying oils. Oils, which on hydrolysis furnish suitable mixtures of unsaturated fatty acids, are dehydrated castor oil, linseed oil, tung oil, perilla oil, soybean oil, oiticica oil, poppyseed oil, fish oils, cottonseed oil, safflower oil, sunflower oil, etc. The fatty acids from these oils are for the most part acids which contain 18 carbon atoms. However, unsaturated acids containing less than 18 carbon atoms such as acids of 14 and 16 carbon atoms, and unsaturated acids containing more than 18 carbon atoms such as acids of 20 and 22 carbon atoms, as is the case of the fish oils, may be used. In the case of the fatty acids derived from tung oil and oiticica oil, due to their strong drying tendency, it is preferable to dilute them with less unsaturated fatty acids such as oleic acid, etc.

The proportion of fatty acid to polyvinyl alcohol may be varied as desired. Generally speaking, at least one mole of fatty acid is used per hydroxyl mole of polyvinyl alcohol. In the case of fatty acids obtained from naturally occurring drying oils, such as linseed oil fatty acids, the fatty acids are preferably used in an excess of from about 10% to about 25% in excess of molar proportions. However, in the case of some unsaturated fatty acids, it may be necessary to employ the fatty acid or acids in an excess up to about 50% excess of molar proportions.

As may be seen from the foregoing examples, the reaction products of this invention are prepared by first dissolving the polyvinyl alcohol in a mutual solvent for it and for the unsaturated fatty acid. In general, solution of the polyvinyl alcohol in the mutual solvent may be accomplished at any suitable temperature. Preferably a temperature within the range from about 100° C. to about 200° C. is used. The polyvinyl alcohol will dissolve in the solvent such as phenol to form a clear, homogeneous, light-colored solution at 160° C. in concentrations up to about 25% by weight. The unsaturated fatty acids are thereafter added slowly until in the previously clear solution there is produced a slight haze, which gradually disappears as esterification proceeds. There is an attendant gradual rise in the temperature of the reaction mixture as the mutual solvent and water of esterification distill off and as the fatty acids are added. However, as the reaction proceeds, the ester product itself acts as a mutual solvent for the reactants and the mutual solvent originally employed may be gradually removed. This initial phase of the reaction generally requires about 4 hours, and completion of the esterification and removal of the mutual solvent require heating for a further period of from about 2 hours to about 5 hours at a temperature within the range of from about 150° C. to about 250° C. and preferably at about 170° C. to about 235° C. The reaction mixture is preferably sparged with an inert gas, such as carbon dioxide, nitrogen, etc., or a vacuum, in order to aid in the complete removal of the solvent. The resulting product will have an acid number which is dependant on the excess of fatty acid used and upon the extent of reaction which has taken place.

Unreacted fatty acids can be removed from the reaction product by vacuum distillation, for example, at pressures of 1 to 2 mm. of mercury and at temperatures not in excess of 200° C.

An alternative procedure for removing unreacted fatty acids is exemplified by the methanol extraction process shown in the examples. Broadly expressed, this procedure involves contacting the reaction product with a material which is essentially a solvent for the unreacted fatty acid or acids and at the same time a non-solvent for the ester. For this purpose, instead of the methyl alcohol employed in the examples, there may be used suitably any aliphatic alcohol, such as ethyl alcohol, propyl alcohol, and isopropyl alcohol. By contacting the relatively impure ester with such a solvent, an ester having an acid number of 35 or less may ultimately be produced.

Any material which is a solvent for both the polyvinyl alcohol and the unsaturated fatty acids and which is nonreactive with the fatty acids and polyvinyl alcohol under the reaction conditions may be employed in carrying out the reaction in accordance with this invention. Thus, a phenol such as phenol, the cresols and the xylenols have also been found useful in preparing these new reaction products. In dissolving the polyvinyl alcohol in the solvent, solutions containing as high as about 25% of polyvinyl alcohol may be employed in the method of this invention. It is preferred, however, to employ solutions containing from about 10% to about 15% of polyvinyl alcohol, because such solutions have lower viscosity and are more easily handled. The recovery of phenol, cresol, or other solvent material is generally of the order of 90%. Such solvent can be re-used as recovered, but preferably it is redistilled before re-use.

The polyvinyl alcohol-unsaturated fatty acid esters prepared in accordance with this invention are new compositions of matter which are of particular value in coating compositions. These new reaction products are in the nature of synthetic drying oils which set to tough, hard films when used with cobalt drier, the cobalt drier being used in an amount such that there is present from 0.01% to 0.05% cobalt metal, based on the weight of the non-volatiles in solution. As these films age, they dry harder but do not become brittle. They are exceptionally scuff-resistant, will not lift under lacquer solvents when applied in thin films, possess good water resistance, fair alkali resistance, and produce films having unusual depth of finish and gloss. Films formed from these reaction products show an unusual degree of durability when subjected to outdoor exposure tests. They were found to be equivalent in this respect to a 35 gallon tung oil oleoresinous varnish.

Coating compositions may be prepared from the reaction products of this invention by dissolving them in xylene, preferably from about 25% to about 50% (based on the weight of the nonvolatile materials present) or in some other suitable solvent, such as toluene, the ester solvents as butyl acetate, hydrogenated naphthas, and the high solvency aliphatic hydrocarbons, such as decalin and tetralin. In the preparation of a coating composition, it is preferable to add any of the common antioxidants in the proportions generally employed in the coating composition art. Thus, in place of the guaiacol disclosed in the examples, there may be used hydroquinone, beta-naphthol, aniline, etc. When the coating composition is ready for use, a cobalt drier may be added to the extent that there is present from 0.01 to 0.05% cobalt metal, based upon the weight of the nonvolatiles in solution.

If desired, these new reaction products may be used with resins, such as ester gum, pentaerythritol esters of rosin, etc., to form varnishes. These new products are particularly valuable for the preparation of varnishes since they do not require long cooking and provide varnishes having rapid drying properties. To prepare varnishes, the reaction products of this invention and a resin are merely heated to 220–230° C. and thinned. The long cooking at higher temperatures required by the prior art drying oils is eliminated.

These new reaction products may also be used to fortify natural drying oils to improve the drying characteristics of the latter. Drying oils and semidrying oils such as soybean oil, linseed oil, etc., may be improved by the addition of varying amounts of the polyvinyl alcohol esters of this invention. These admixtures may then be processed further into paints, varnishes, etc.

Thus, the polyvinyl alcohol esters of this invention are advantageous in that they can be used as protective coatings without further processing, such as kettling into varnishes. These esters show unusual "hold out" characteristics when used as wood sealers in furniture finishes, and compare favorably with long oil oleoresinous varnishes having an oil length of about 35 gallons in outdoor exposures. They may also be used in combination with resins to produce improved varnishes. In addition, by means of the reaction in accordance with this invention it is possible to convert fatty acids of non- or semi-drying oils such as oleic acid, etc., into rapid drying oils.

What I claim and desire to protect by Letters Patent is:

1. A water-insoluble reaction product of a polyhydric alcohol and at least one mol per hydroxyl mol of the polyhydric alcohol of an ethylenically unsaturated fatty acid material of the group consisting of unsaturated fatty acids containing at least 14 carbon atoms and mixtures thereof, said polyhydric alcohol being a member of the group consisting of polyvinyl alcohols having an average molecular weight of from 6,000 to 80,000 and such polyvinyl alcohols which are acetylated to any extent up to and including 60%.

2. The method which comprises heating at a temperature within the range of from 150° C. to 250° C. a polyhydric alcohol and an ethylenically unsaturated fatty acid material of the group consisting of unsaturated fatty acids containing at least 14 carbon atoms and mixtures thereof, in solution in a mutual solvent for said alcohol and said unsaturated fatty acid material, for a period of time sufficient to produce a reaction product of the alcohol and the unsaturated fatty acid material, said polyhydric alcohol being a member of the group consisting of polyvinyl alcohols having an average molecular weight of from 6,000 to 80,000 and such polyvinyl alcohols which are acetylated to any extent up to and including 60%, said ethylenically unsaturated fatty acid material being employed in the amount of at least one mol per hydroxyl mol of the polyhydric alcohol.

3. The method which comprises heating at a temperature within the range of from 150° C. to 250° C. a polyhydric alcohol and an ethylenically unsaturated fatty acid material of the group consisting of unsaturated fatty acids containing at least 14 carbon atoms and mixtures thereof, in solution in a phenol, for a period of time sufficient to produce a reaction product of the alcohol and the unsaturated fatty acid material, said polyhydric alcohol being a member of the group consisting of polyvinyl alcohols having an average molecular weight of from 6,000 to 80,000 and such polyvinyl alcohols which are acetylated to any extent up to and including 60%, said ethylenically unsaturated fatty acid material being employed in the amount of at least one mol per hydroxyl mol of the polyhydric alcohol.

4. The method which comprises heating at a temperature within the range of from 150° C. to 250° C. a polyhydric alcohol and an ethylenically unsaturated fatty acid material of the group consisting of unsaturated fatty acids containing at least 14 carbon atoms and mixtures thereof, in solution in phenol, for a period of time sufficient to produce a reaction product of the alcohol and the unsaturated fatty acid material, said polyhydric alcohol being a member of the group consisting of polyvinyl alcohols having an average molecular weight of from 6,000 to 80,000 and such polyvinyl alcohols which are acetylated to any extent up to and including 60%, said ethylenically unsaturated fatty acid material being employed in the amount of at least one mol per hydroxyl mol of the polyhydric alcohol.

5. The method which comprises heating at a temperature within the range of 150° C. to 250° C. a polyvinyl alcohol having an average molecular weight of from 6,000 to 80,000 and a mixture of fatty acids obtained by the hydrolysis of linseed oil, in solution in phenol, for a period of time sufficient to produce a reaction product of the alcohol and the fatty acids, said mixture of fatty acids being employed in the amount of at least one mol per hydroxyl mol of the polyvinyl alcohol.

6. The method which comprises heating at a temperature within the range of 150° C. to 250° C. a polyvinyl alcohol having an average molecular weight of from 6,000 to 80,000 and a mixture of fatty acids obtained by the hydrolysis of dehydrated castor oil, in solution in phenol, for a period of time sufficient to produce a reaction product of the alcohol and the fatty acids, said mixture of fatty acids being employed in the amount of at least one mol per hydroxyl mol of the polyvinyl alcohol.

7. The method which comprises heating at a temperature within the range of 150° C. to 250° C. a polyvinyl alcohol having an average molecular weight of from 6,000 to 80,000 and a mixture of fatty acids obtained by the hydrolysis of soybean oil, in solution in phenol, for a period of time sufficient to produce a reaction product of the alcohol and the fatty acids, said mixture of fatty acids being employed in the amount of at least one mol per hydroxyl mol of the polyvinyl alcohol.

8. The method which comprises heating at a temperature within the range of from 150° C. to 250° C. a polyhydric alcohol and an ethylenically unsaturated fatty acid material of the group consisting of unsaturated fatty acids containing at least 14 carbon atoms and mixtures thereof, in solution in a mutual solvent for said alcohol and said unsaturated fatty acid material, for a period of time sufficient to produce a reaction product of the alcohol and the unsaturated fatty acid material, and thereafter extracting the resulting reaction product with a material which is a nonsolvent for said reaction product and a solvent for any unsaturated fatty acids associated with said reaction product to produce a purified reaction product of low acid value, said polyhydric alcohol being a member of the group consisting of polyvinyl alcohols having an average molecular weight of from 6,000 to 80,000 and such polyvinyl alcohols which are acetylated to any extent up to and including 60%, said ethylenically unsaturated fatty acid material being employed in the amount of at least one mol per hydroxyl mol of the polyhydric alcohol.

9. A coating composition comprising a reaction product of claim 1 and a solvent for the reaction product which is nonreactive with the other ingredients of the composition.

10. A coating composition comprising a reaction product of claim 1, an antioxidant, and a solvent for the reaction product which is nonreactive with the other ingredients of the composition.

11. A coating composition comprising a reaction product of claim 1, an antioxidant, a drier, and a solvent for the reaction product which is nonreactive with the other ingredients of the composition.

12. A water-insoluble reaction product of a polyhydric alcohol and at least one mol per hydroxyl mol of the polyhydric alcohol of a mixture of ethylenically unsaturated fatty acids containing at least 14 carbon atoms, said polyhydric alcohol being a member of the group consisting of polyvinyl alcohols having an average molecular weight of from 6,000 to 80,000 and such polyvinyl alcohols which are acetylated to any extent up to and including 60%.

13. A water-insoluble reaction product of a polyvinyl alcohol having an average molecular weight of from 6,000 to 80,000 and at least one mol per hydroxyl mol of the polyvinyl alcohol of a mixture of ethylenically unsaturated fatty acids containing at least 14 carbon atoms.

14. A water-insoluble reaction product of a polyvinyl alcohol having an average molecular weight of from 10,000 to 60,000 and at least one mol per hydroxyl mol of the polyvinyl alcohol of a mixture of ethylenically unsaturated fatty acids containing at least 14 carbon atoms.

15. A water-insoluble reaction product of a polyvinyl alcohol having an average molecular weight of from 10,000 to 60,000 and at least one mol per hydroxyl mol of the polyvinyl alcohol of linseed oil acids.

16. A water-insoluble reaction product of a polyvinyl alcohol having an average molecular weight of from 10,000 to 60,000 and at least one mol per hydroxyl mol of the polyvinyl alcohol of dehydrated castor oil acids.

17. A water-insoluble reaction product of a polyvinyl alcohol having an average molecular weight of from 10,000 to 60,000 and at least one mol per hydroxyl mol of the polyvinyl alcohol of soybean oil acids.

18. A water-insoluble reaction product of a polyvinyl alcohol having an average molecular weight of about 14,000 and at least one mol per hydroxyl mol of the polyvinyl alcohol of linseed oil acids.

19. A water-insoluble reaction product of a polyvinyl alcohol having an average molecular weight of about 14,000 and at least one mol per hydroxyl mol of the polyvinyl alcohol of dehydrated castor oil acids.

20. A water-insoluble reaction product of a polyvinyl alcohol having an average molecular weight of about 14,000 and at least one mol per hydroxyl mol of the polyvinyl alcohol of soybean oil acids.

GLENWOOD L. SCHERTZ.

(References on following page)

REFERENCES CITED

The following references are of record in the file of this patent:

UNITED STATES PATENTS

| Number | Name | Date |
|---|---|---|
| 1,893,874 | Adams | Jan. 10, 1933 |
| 2,145,345 | Dreyfus | Jan. 31, 1939 |
| 2,184,288 | Dangelmajer | Dec. 26, 1939 |
| 2,249,535 | Macallum | July 15, 1941 |
| 2,332,896 | D'Alelio | Oct. 26, 1943 |
| 2,378,827 | Bradley | June 19, 1945 |

FOREIGN PATENTS

| Number | Country | Date |
|---|---|---|
| 534,213 | Germany | Sept. 23, 1931 |
| 395,478 | Great Britain | July 20, 1933 |

OTHER REFERENCES

Berichte, vol. 60, 1927, page 1662.